UNITED STATES PATENT OFFICE.

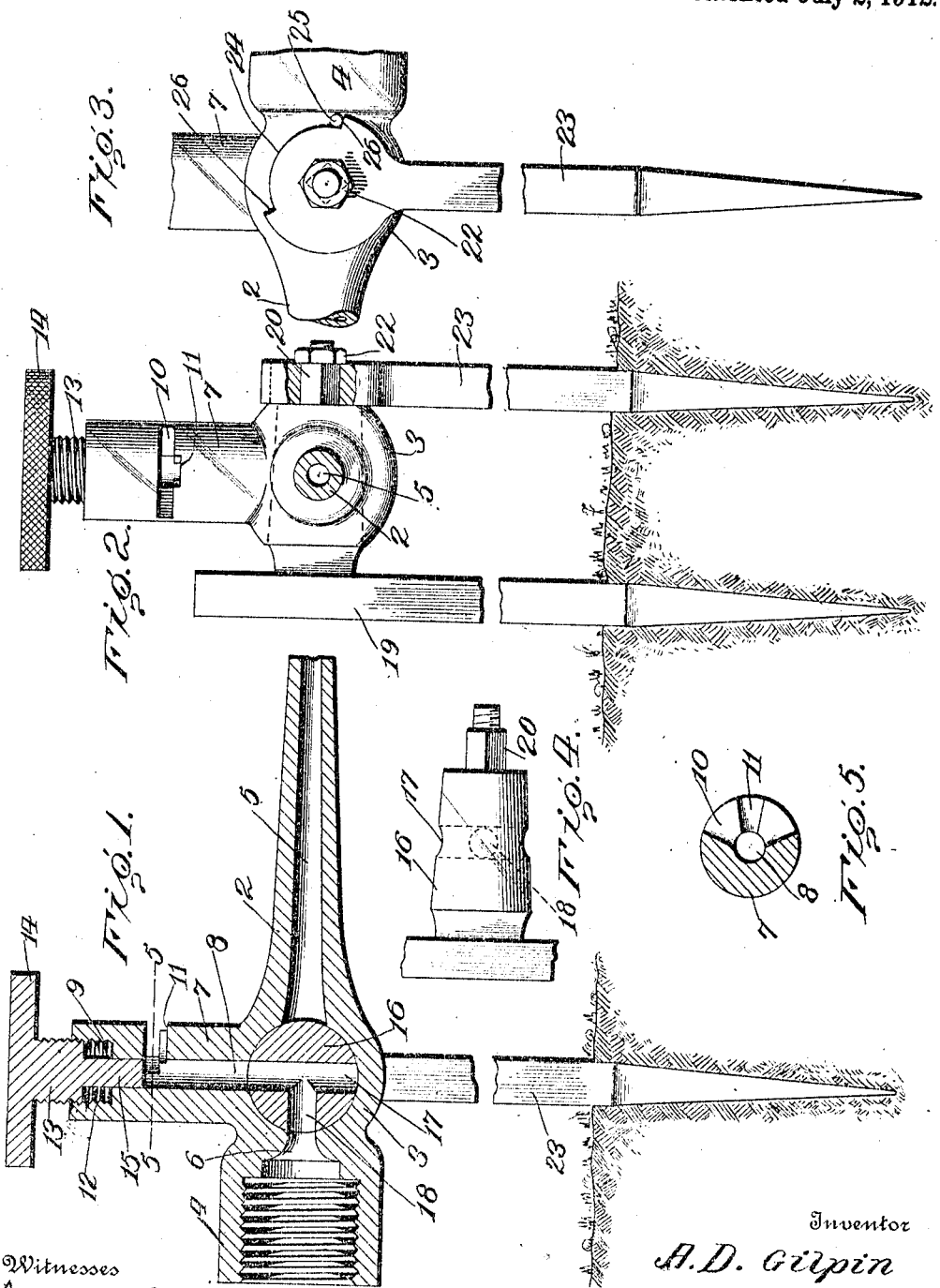

ALBERT D. GILPIN, OF LINCOLN, KANSAS.

COMBINED NOZZLE, SPRAYER, AND SPRINKLER.

1,031,176.      Specification of Letters Patent.      Patented July 2, 1912.

Application filed June 20, 1911. Serial No. 634,352.

*To all whom it may concern:*

Be it known that I, ALBERT D. GILPIN, citizen of the United States, residing at Lincoln, in the county of Lincoln and State of Kansas, have invented certain new and useful Improvements in Combined Nozzles, Sprayers, and Sprinklers, of which the following is a specification.

My invention relates to a combined hose, nozzle and sprayer, and the primary object of the invention is the provision of a very simple and effective device of this character which may be used either as a nozzle for directing a full stream of water from the hose, as a sprayer for distributing the water from the hose in the form of a fine fan-shaped spray suitable for watering a lawn, or for projecting the water in a very small sprinkling jet.

A further object in this connection is to provide means for projecting the spray in the general direction of the nozzle itself so that the nozzle and sprayer may be handled without the operator getting wet.

A still further object is to provide means whereby the device when used as a sprayer or sprinkler may be supported on the ground, and in this connection to provide means for positively holding the valve which regulates the flow of water in its adjusted position and for positively preventing the valve, when the device is set in the ground, from being turned to permit a full flow of water from the nozzle, thus preventing damage to tender plants and preventing washing away of the earth around the roots of the plants.

An embodiment of my invention is illustrated in the accompanying drawings wherein:

Figure 1 is a vertical longitudinal section through my improved sprayer and nozzle, one of the supporting spikes being shown in elevation. Fig. 2 is a front elevation of the combined sprayer and nozzle, the nozzle being in section and the upper end of one of the spikes being broken away. Fig. 3 is a fragmentary end elevation of the construction shown in Fig. 2. Fig. 4 is an elevation of the valve detached from the nozzle and a portion of the connected spike. Fig. 5 is a section on the line 5—5 of Fig. 1.

Corresponding and like parts are referred to in the following description and indicated in all the views of the accompanying drawings by the same reference characters.

Referring to these figures, it will be seen that my invention comprises a nozzle 2 formed with a globular valve body 3 and with an attaching nipple 4 internally screw threaded or corrugated for attachment to the end of a hose, the hose not being shown. The nozzle 2 is provided with a straight-away passage 5 as usual which opens into the interior of the globular valve body 3, while the attaching nipple 4 is also provided with a port 6 opening into the valve body in alinement with the passage 5.

Formed integral with the valve body 3 and extending upward therefrom is a tubular extension 7 which opens at its lower end into the valve body. The passage 8 of this tubular extension extends up to the upper end of the extension and opens into a recess 9 formed in the upper end of the extension. The anterior face of the extension 7 is formed with an arcuate slot 10 which preferably extends through an arc of about 170°. At the middle point of this slot the slot is enlarged as at 11, this enlargement being slightly flared outward and forming a sprinkling outlet of discharge.

The interior face of the wall surrounding the recess 9 is internally screw threaded as at 12, and in order to regulate the flow of water through the spraying slot 10 or through the sprinkling orifice 11, I provide a plug 13 whose body is exteriorly screw threaded to engage with the screw threads 12, this plug being provided at its upper end with a hand wheel 14 whereby it may be manipulated. The lower end of the plug is reduced in diameter so that the lower portion 15 exactly fits the passage 8. By rotating the plug 13 in one direction, the portion 15 will move downward in the passage 8 to reduce or entirely cut off the outlet opening 10. By raising the plug 13, the outlet opening 10 may be entirely unobstructed to permit a full flow of water through the spraying slot. By rotating the plug 13 until its lower end has moved down to a point just above the orifice 11, the water passing through the passage 8 will be discharged through the orifice 11 in the form of a very fine sprinkle. When the plug 13 is raised, however, so as to uncover all or a portion of the inlet end of the slot 10, the water will be discharged from the slot in the form of a fine fan-shaped spray.

Disposed within the valve body 3 is the rotatable cylindrical valve 16 which is slightly tapering. This valve is formed with a diametrically extending passage 17 and a passage 18 which extends inward from the face of the plug and intersects the passage 17 at right angles. In other words, this is a two-way cylindrical valve. When the valve is turned to a position at right angles to that in Fig. 1, the passage 17 will be in communication with the passages 5 and 6 of the nozzle, and water will be directed in a straightaway path from the hose through the nozzle. When, however, the valve is turned to the position shown in Fig. 1, water will be directed into the passage 18 and then upward through the passage 17 into the tubular extension 7 and out through the slot 10 or the orifice 11. The amount of water which may be directed through the sprayer or through the nozzle may of course be regulated by slightly turning the valve to any required degree, while the character of the spray issuing from the slot 10, or the character of the small stream or sprinkle issuing from the orifice 11 will depend upon the adjustment of the plug 13.

The valve 16 may be turned by any suitable handle. Preferably, however, I provide a handle having the form of a spike and designated 19. The lower end of this spike is pointed so that it may be driven firmly into the ground, while the upper end of the spike extends above the valve 16 and affords a square abutment to receive the blows of a mallet or other means for forcing the spike into the ground. I may attach the spike 19 to one end of the valve 16 in any suitable manner so that the spike 19 is rigid therewith. The other extremity of the valve, however, is formed with a square or many sided head 20, and beyond this head the metal of the valve is reduced and externally screw threaded to receive a nut 22. A companion spike 23 is formed with a square opening at one end which fits over the square head 20 and against the outer face of this spike 23 the nut 22 bears. The upper end of the spike 23 is enlarged so as to form a washer bearing against the end of the valve body 3. The face of the washer so formed is provided with an arcuate recess 24 and the end of the body 3 is formed with a pin 25 which operates in the arcuate recess 24, the ends of the recess forming stop shoulders 26 which limit the movement of the valve relative to the body 3 and prevent the valve from being turned entirely around and thus provide that the valve shall be turned only through a quarter of a circle from the position shown in Fig. 1 to a position at right angles thereto.

It will be seen that the valve is only turned to permit water to pass to the slot 10 when the spikes 19 and 23 are turned downward into position where they may be forced into the ground, and that when forced into the ground they will positively prevent any accidental movement of the valve 16 which would tend to close the sprayer outlet 10 and open the passage through the nozzle 5. Thus there is no danger of the valve becoming accidentally disarranged while plants are being sprayed and the nozzle opened so as to permit a stream to issue therefrom and damage the lawn or garden. When the device is to be used as an ordinary hose nozzle for washing pavements, etc., the valve is turned so that the spikes 19 and 23 extend parallel to the hose itself. It will be seen that not only does this arrangement of spikes indicate to the user whether the nozzle or the sprayer is turned on, but it also prevents the nozzle from being accidentally turned on when it is desired to use the sprayer. In other words, it is impossible for the nozzle to be used when the device is planted in the ground as when spraying. It is not desirable to use the nozzle with the spikes at any time so that these spikes not only act as a reminder to the user but also act to positively prevent the nozzle being used when it is desired to use the sprayer.

It is to be particularly pointed out that the spraying slot 10 is arranged on the anterior face of the extension 7 and that therefore the spray is projected from the extension 7 in a semicircle or in a wide fan shape. It is not projected in all directions and hence the operator may easily approach the sprayer from the rear, take the nozzle up and carry it to any desired point of the garden and reset it without the necessity of turning off the water and without getting wet. It also permits the sprayer to be carried in the hand and used when occasion requires without setting the device in the ground. Furthermore, inasmuch as the sprinkling orifice 11 is directly above the nozzle, the device may be held in the hand while sprinkling plants, inasmuch as the small spray or stream passing out of the orifice 11 will be directed in the direction of the nozzle 2. As before stated, the character of the spray and the amount thereof may be regulated by turning the hand wheel 14 in one direction or the other and the spray may be reduced or the sprinkling stream reduced to any desired dimensions by this means.

What I claim is:

1. A combination nozzle and sprayer comprising a nozzle and an extension extending therefrom formed with a spraying opening, a valve directing the flow of liquid either into the spraying extension or into the nozzle, a valve in the extension for regulating the flow of liquid through the spraying opening thereof, and a spike attached to the first named valve and forming a handle for the same whereby the valve may be turned, said spike when in its depending position being adapted to engage with the ground and hold the valve in such position as to direct liquid through the spraying opening.

2. A combined nozzle and sprayer comprising a nozzle, a tubular extension at right angles to the nozzle having an arcuate slot on its anterior face facing in the direction of the nozzle, the lower edge of the slot being enlarged at its middle, said tubular member having a recess at its upper end opening by a reduced passage into the interior of the tubular member, the wall of said recess being screw threaded, a screw threaded plug engaging in said recess and having an extension projecting into the passage of the tubular member and fitting the same, said plug being screw threaded to permit it to be turned in positions to cut off or permit the passage of liquid through the slot, and a valve for directing the flow of liquid either into said nozzle or the tubular extension.

3. A combination nozzle and sprayer comprising a nozzle, an extension at right angles to the nozzle having an arcuate slot on its anterior face communicating with the interior of the extension, a valve seated at the junction of the nozzle with the extension for directing the flow of liquid either through the extension or through the nozzle, and a spike connected to the exterior end of said valve.

4. A combination nozzle and sprayer comprising a nozzle, an extension therefrom formed with a spraying opening, a valve seated at the junction of the nozzle with the extension rotatable in both directions to direct the flow of liquid either into the spraying extension or into the nozzle, means for holding the valve set with relation to the nozzle and extension, and means attached to the valve and forming a handle for the same whereby the valve may be turned, said means when in its depending position being adapted to engage with the ground and hold the valve in such position as to direct liquid through the spraying opening.

5. A combination nozzle and sprayer comprising a nozzle, an extension at right angles to the nozzle having an arcuate slot on its face, a valve seated at the junction of the nozzle with the extension for directing the flow of liquid either into the extension or into the nozzle, and spikes connected at both ends of the valve to turn therewith and adapted to be forced into the ground, said spikes holding the valve in adjusted position when inserted into the ground.

6. A combination nozzle and sprayer comprising a nozzle, a tubular extension at right angles to the nozzle having a spraying slot on its exterior face communicating with the interior of the extension, a valve for controlling the flow of liquid through said slot, a valve seated at the junction of the nozzle with the extension for directing the flow of liquid either through the extension or the nozzle, and a spike attached to one end of the valve and forming a handle therefor and adapted to be inserted in the ground.

In testimony whereof, I affix my signature in presence of two witnesses.

ALBERT D. GILPIN. [L. S.]

Witnesses:
 J. A. FARQUHARSON,
 E. GOULD.